(12) United States Patent
Ochiai et al.

(10) Patent No.: US 6,246,940 B1
(45) Date of Patent: Jun. 12, 2001

(54) SPEED CHANGE CONTROLLER FOR AUTOMATIC TRANSMISSION

(75) Inventors: Tatsuo Ochiai, Chigasaki; Hirofumi Okahara, Isehara, both of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/111,594

(22) Filed: Jul. 7, 1998

(30) Foreign Application Priority Data

Jul. 11, 1997 (JP) .................................................... 9-186614
Jul. 23, 1997 (JP) .................................................... 9-196931
Jul. 23, 1997 (JP) .................................................... 9-196932

(51) Int. Cl.$^7$ ........................................................ F16H 9/00
(52) U.S. Cl. ................................ 701/51; 701/70; 477/46; 477/48; 474/18
(58) Field of Search ............................ 701/51; 364/424.1; 477/46, 48

(56) References Cited

U.S. PATENT DOCUMENTS

| | | | |
|---|---|---|---|
| 4,823,267 | * | 4/1989 | Kumura ............................ 364/424.1 |
| 5,695,428 | * | 12/1997 | Yuasa et al. ............................ 477/48 |
| 5,820,514 | * | 10/1998 | Adachi ................................... 477/46 |
| 5,857,937 | * | 1/1999 | Ashizawa et al. ...................... 477/46 |
| 5,931,884 | * | 8/1999 | Ochiai ................................... 701/51 |

FOREIGN PATENT DOCUMENTS 05248523    9/1993   (JP) .

* cited by examiner

Primary Examiner—William A. Cuchlinski, Jr.
Assistant Examiner—Tuan C. To
(74) Attorney, Agent, or Firm—Foley & Lardner

(57) ABSTRACT

In a vehicle transmission wherein plural speed change ratios from a largest speed change ratio to a smallest speed change ratio are selectively applied according to a command input by a driver, a real speed change ratio of the transmission is detected. It is determined whether or not the transmission is performing a shift-down based on the input command and the real speed change ratio. A shift-down limit speed change ratio is determined based on the speed change ratio before the shift-down operation is performed, and when the engine brake of the vehicle is operating, the transmission is controlled so as not to apply a speed change ratio larger than this shift-down limit speed change ratio. Due to this, the driver does not experience an excessive engine braking sensation even when an extreme speed change command is issued.

8 Claims, 5 Drawing Sheets

10 CONTROLLER
11 PRIMARY PULLEY ROTATION SPEED SENSOR
12 SECONDARY PULLEY ROTATION SPEED SENSOR
13 VEHICLE SPEED SENSOR
14 THROTTLE OPENING SENSOR
15 INHIBITOR SWITCH
16 M RANGE SWITCH
17 SPEED CHANGE COMMAND DETECTION SWITCH
20 M RANGE SPEED CHANGE RATIO DETERMINING UNIT
21 TARGET PRIMARY ROTATION SPEED COMPUTING UNIT
22 FINAL TARGET SPEED CHANGE RATIO COMPUTING UNIT
23 SPEED CHANGE RATIO LIMITER UNIT
24 TRANSIENT TARGET SPEED CHANGE RATIO COMPUTING UNIT
25 REAL SPEED CHANGE RATIO COMPUTING UNIT
26 TARGET SPEED CHANGE RATIO DEVIATION COMPUTING UNIT
27 TIME CONSTANT COMPUTING UNIT
28 TIME CONSTANT LOWER LIMIT LIMITING UNIT
29 TIME CONSTANT VARIATION SPEED UPPER LIMIT LIMITING UNIT
30 MOTOR DRIVE SIGNAL COMPUTING UNIT
32 ACCELERATION SENSOR

FIG. 5

SPEED CHANGE CONTROLLER FOR AUTOMATIC TRANSMISSION

The contents of Tokugan Hei 9-186614, with a filing date of Jul. 11, 1997 in Japan, Tokugan Hei 9-196931 and 9-196932, with a filing date of Jul. 23, 1997 in Japan, are hereby incorporated by reference.

FIELD OF THE INVENTION

This invention relates to a speed change controller for use with an automatic transmission of a vehicle in which a manual operation mode is provided.

BACKGROUND OF THE INVENTION

In an automatic transmission for a vehicle, the speed change ratio is varied automatically according to vehicle speed or throttle opening, etc. Apart from the automatic operation mode, a speed change control device which permits manual operation by a driver is disclosed in Tokkai Hei 5-322022 published by the Japanese Patent Office in 1993.

This device comprises an operating lever for the driver to input a shift-up command or shift-down command into the speed change control device. In manual mode speed change, the automatic transmission performs shift-up or shift-down operations according to the operating direction and operating frequency of the operating lever. That is to say when, for example, the operating lever is moved twice in the shift-down direction from fourth speed, a shift-down to second speed from fourth speed is performed.

However, when operations of the operating lever are successively performed in the same direction, the speed changes abruptly from fourth speed to first speed in a short time, and as a result the driver experiences an excessive engine braking sensation.

SUMMARY OF THE INVENTION

It is therefore an object of this invention to limit manual speed change operations in an automatic transmission comprising a manual mode speed change, such that a driver would not experience an excessive engine braking sensation.

In order to achieve the above object, this invention provides a speed change controller for outputting a speed change ratio command signal to a transmission of a vehicle for selectively applying plural speed change ratios from a largest speed change ratio to a smallest speed change ratio according to a command input by a driver. The vehicle comprises an engine being capable of exerting an engine brake on the vehicle according to a reduction operation input by the driver.

The controller comprises an engine brake sensor for detecting whether or not the vehicle is under the action of the engine brake, a real speed change ratio detection sensor for detecting a real speed change ratio of the transmission, and a microprocessor programmed to determine whether or not the transmission is performing a shift-down operation based on the real speed change ratio and the speed change ratio command signal, determine a shift-down limit speed change ratio based on the speed change ratio before the shift-down operation is performed, and refrain from outputting a speed change ratio command signal corresponding to a speed change ratio larger than the shift-down limit speed change ratio when the vehicle is under the action of the engine brake.

The details as well as other features and advantages of this invention are set forth in the remainder of the specification and are shown in the accompanying drawings.

DESCRIPTION OF THE PREFERRED EMBODIMENTS

Figure 1:
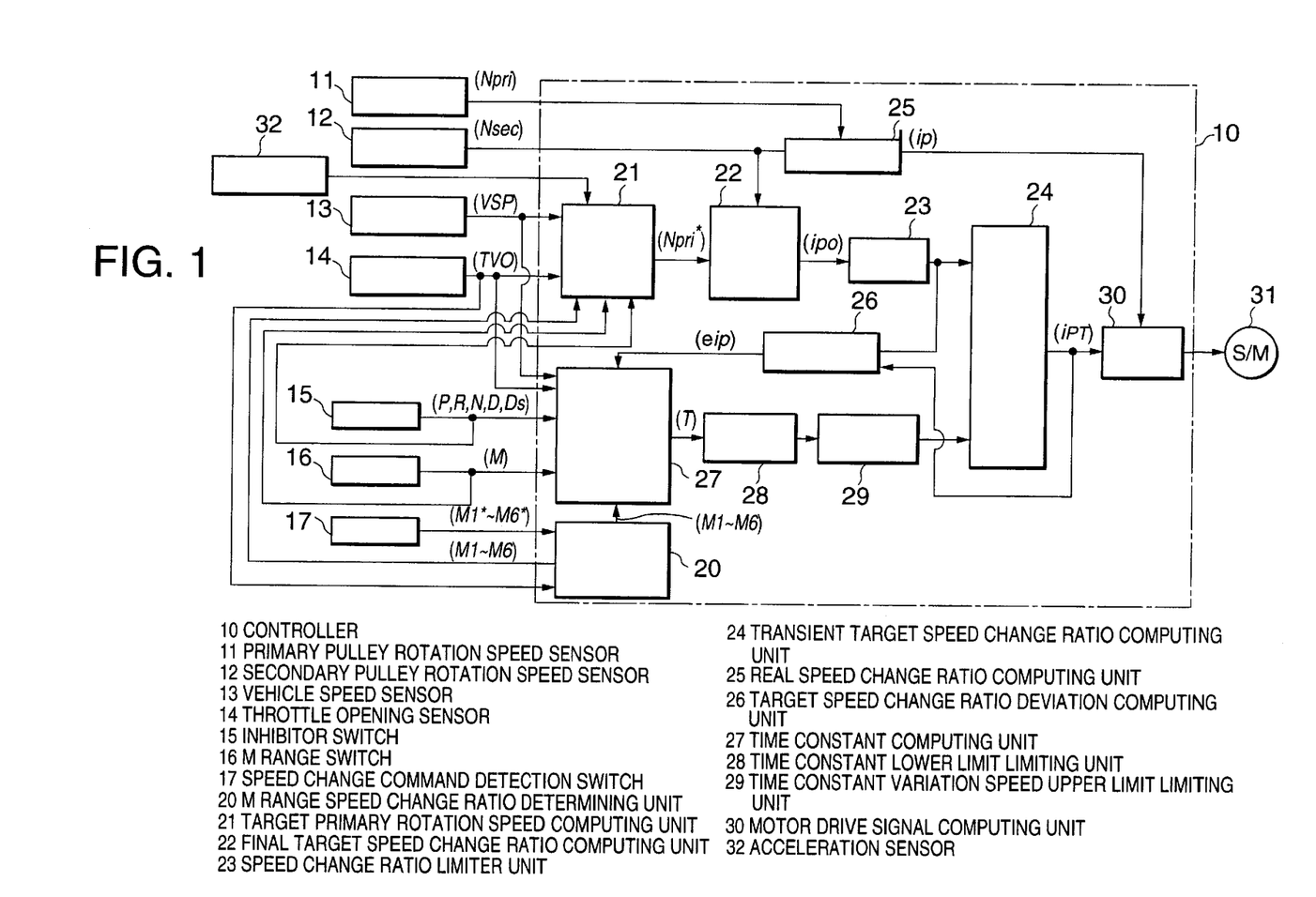
FIG. 1 is a schematic diagram of a speed change control device according to this invention.

Referring to FIG. 1 of the drawings, a speed change control device according to this invention is provided with a controller 10 and a step motor 31 which perform speed change control of a V-belt continuously variable transmission.

The V-belt continuously variable transmission comprises a primary pulley joined to the engine via a torque converter, a secondary pulley joined to a propeller shaft which rotates the wheels and a V-belt looped around these pulleys as disclosed in the aforesaid Tokkai Hei 7-301297 as well as U.S. Pat. No. 5,178,044, U.S. Pat. No. 5,313,125. A desired speed change ratio is obtained by varying the groove width of these pulleys, the groove width being varied according to the angular position of the step motor 31.

The controller 10 comprises a microcomputer comprising a central processing unit (CPU), read-only memory (ROM), random access memory (RAM) and input-output interface (I/O interface).

Signals are input to the controller 10 from a primary pulley rotation speed sensor 11 which detects a rotation speed Npri of the primary pulley, a secondary pulley rotation speed sensor 12 which detects a rotation speed Nsec of the secondary pulley, a vehicle speed sensor 13 which detects a vehicle speed VSP, a throttle opening sensor 14 which detects a throttle opening TVO of an engine, an inhibitor switch 15 which detects an automatic operation mode designated by the lever attached to the continuously variable transmission, an M range switch 16 which detects a selection of a manual operation mode of the continuously variable transmission, and a speed change command detection switch 17 which detects a speed change ratio command input value corresponding to a shift-up operation frequency and a shift-down operation frequency in the manual operation mode.

The speed change ratio command input value in the manual operation mode comprises six speeds from a first speed M1* to a sixth speed M6*.

In the manual operation mode, one operation of the lever inputs a command to shift-up or shift-down to an adjacent speed change ratio according to the operation direction thereof. For example, at a fourth speed M4, a shift-down command to the first speed M1 is input by performing three shift-down operations in succession, and then the speed change command detection switch 17 detects a speed change ratio command input value corresponding to the first speed M1.

The M range switch 16 and speed change command detection switch 17 are both attached to the operating lever of the transmission. The operation of this lever enables the driver to perform the selection of the manual operation mode and shift-up or shift-down in the manual operation mode. The automatic operation modes comprise a parking mode P, reverse mode R, neutral mode N, forward ordinary travel mode D and forward high performance travel mode Ds. The forward high performance travel mode Ds is a mode which keeps the engine rotation speed higher than the forward ordinary travel mode D.

Based on these input signals, the controller 10 calculates a target speed change ratio of the continuously variable transmission, and outputs a corresponding drive signal to the step motor 31.

Describing the construction of the controller 10 from a functional viewpoint, as shown in FIG. 1, the controller 10 comprises an M range speed change ratio determining unit 20, a target primary rotation speed computing unit 21, a final target speed change ratio computing unit 22, a speed change ratio limiter unit 23, a transient target speed change ratio computing unit 24, a real speed change ratio computing unit 25, a target speed change ratio deviation computing unit 26, a time constant computing unit 27, a time constant lower limit limiting unit 28, a time constant variation speed upper limit limiting unit 29 and a motor drive signal computing unit 30.

Based on the throttle opening TVO detected by the throttle opening sensor 14, and the speed change ratio command input values M1*–M6* detected by the speed change command detection switch 17, the M range speed change ratio determining unit 20 determines speed change ratio command values M1–M6 in the manual operation mode by a process described hereafter. In the calculation of these speed change ratio command values M1–M6, the throttle opening TVO may be replaced by an accelerator depression amount, or by any other parameter which represents the engine load or the intension of acceleration of the driver.

Figure 2A:
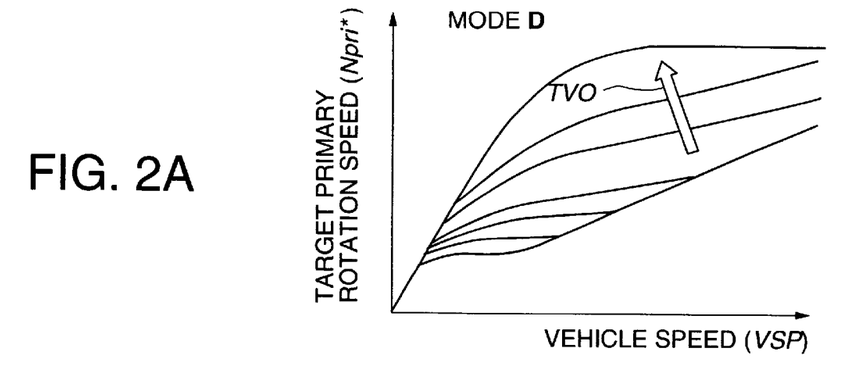
FIGS. 2A–2C are diagrams describing characteristics of an automatic transmission to which this invention is applied according to different operation modes.
Figure 2B:
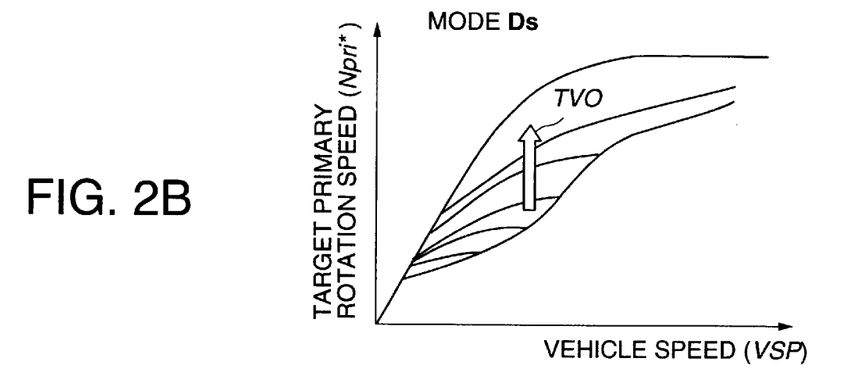

The target primary rotation speed computing unit 21 performs the following processing according to the manual operation mode detected by the M range switch 16. In the automatic operation mode, a target primary rotation speed Npri* is calculated by referring to a map of contents shown in FIGS. 2A and 2B on the basis of the throttle opening TVO, vehicle speed VSP detected by the vehicle speed sensor 13, and automatic operation mode detected by the inhibitor switch 15.

Figure 2C:
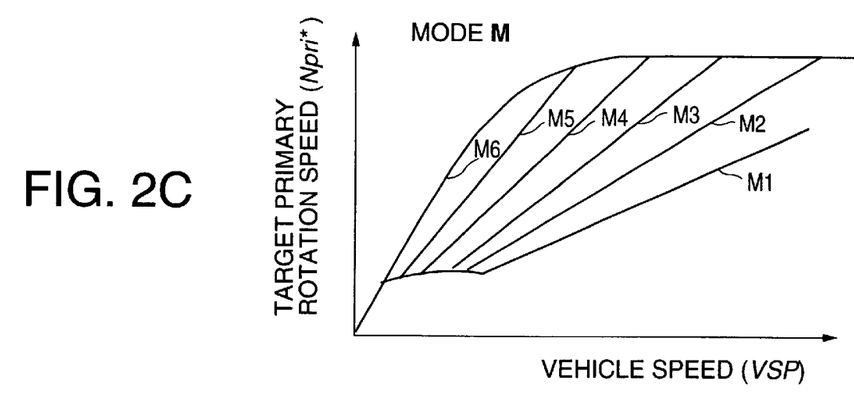

This map is stored beforehand in the ROM of the controller 10. On the other hand, in the manual operation mode, the target primary rotation speed Npri* is calculated by referring to a map of contents shown in FIG. 2C based on the speed change ratio command values M1–M6 determined by the M range speed change ratio determining unit 20 and the vehicle speed VSP. This map is also stored beforehand in the ROM of the controller 10.

The final target speed change ratio computing unit 22 calculates a final target speed change ratio basic value $i_{po}'$ on the basis of the following equation using the target primary rotation speed Npri*, and the rotation speed Nsec of the secondary pulley detected by the secondary pulley rotation speed sensor 12.

$$i'_{po} = \frac{Npri^*}{Nsec}$$

The speed change ratio limiter unit 23 sets a smaller limit value and a larger limit value of the final target speed change ratio based on the operating limits of the hardware involved in speed change. A final target speed change ratio $i_{po}$ is calculated by limiting this final target speed change ratio basic value $i_{po}'$ to smaller and larger limits. The value is then output to the transient target speed change ratio computing unit 24. All the values referred to as final target speed change ratio $i_{po}$ in the following description should be understood to mean values subject to this limit as processed with respect to smaller and larger limiting values.

The real speed change ratio computing unit 25 calculates a real speed change ratio $i_p$ by the following equation on the basis of the primary pulley rotation speed Npri detected by the primary pulley rotation speed sensor 11 and the secondary pulley rotation speed Nsec detected by the secondary pulley rotation speed sensor 12.

$$i_p = \frac{Npri}{Nsec}$$

The target speed change ratio deviation computing unit 26 calculates a difference $ei_p$ between the final target speed change ratio $i_{po}$ processed by the speed change ratio limiter unit 23 and the transient target speed change ratio $i_{pT}$ calculated by the transient target speed change ratio computing unit 24 as described hereafter, by the following equation:

$$ei_p = i_{po} - i_{pt}$$

The time constant computing unit 27 determines the time constant T of speed change control based on the vehicle speed VSP, throttle opening TVO, the selected mode R, N, D or Ds when in the automatic operation mode or the speed change ratio command value M1–M6 when the manual operation mode, and the speed change ratio deviation $ei_p$. The time constant T is a constant to show the response characteristics of the transient target speed change ratio $i_{pT}$ relative to the final target speed change ratio $i_{po}$ and is used when the transient target speed change ratio computing unit 24 determines the transient target speed change ratio $i_{pT}$ from the final target speed change ratio $i_{po}$. Further, the larger the speed change ratio deviation $ei_p$ is, the larger the time constant T.

The time constant lower limiting unit 28 limits the time constant T set in this way so that it is not less than a preset lower limit, and the time constant variation speed upper limit limiting unit 29 sets an upper limit so that the variation rate of the time constant T does not exceed the preset upper limit.

Using the time constant T processed in this way, and the final target speed change ratio $i_{po}$ calculated by the speed change ratio limiter unit 23, the transient target speed change ratio computing unit 24 calculates the transient target speed change ratio $i_{pT}$ by the following equation:

$$i_{pT} = \frac{1}{1 + T \cdot s} \cdot i_{po}$$

where, s=Laplacian operator

A motor drive signal computing unit 30 calculates a step motor drive signal to eliminate this difference based on the difference between the transient target speed change ratio $i_{pT}$ and real speed change ratio $i_p$, and outputs it to the step motor 31.

Figure 3:
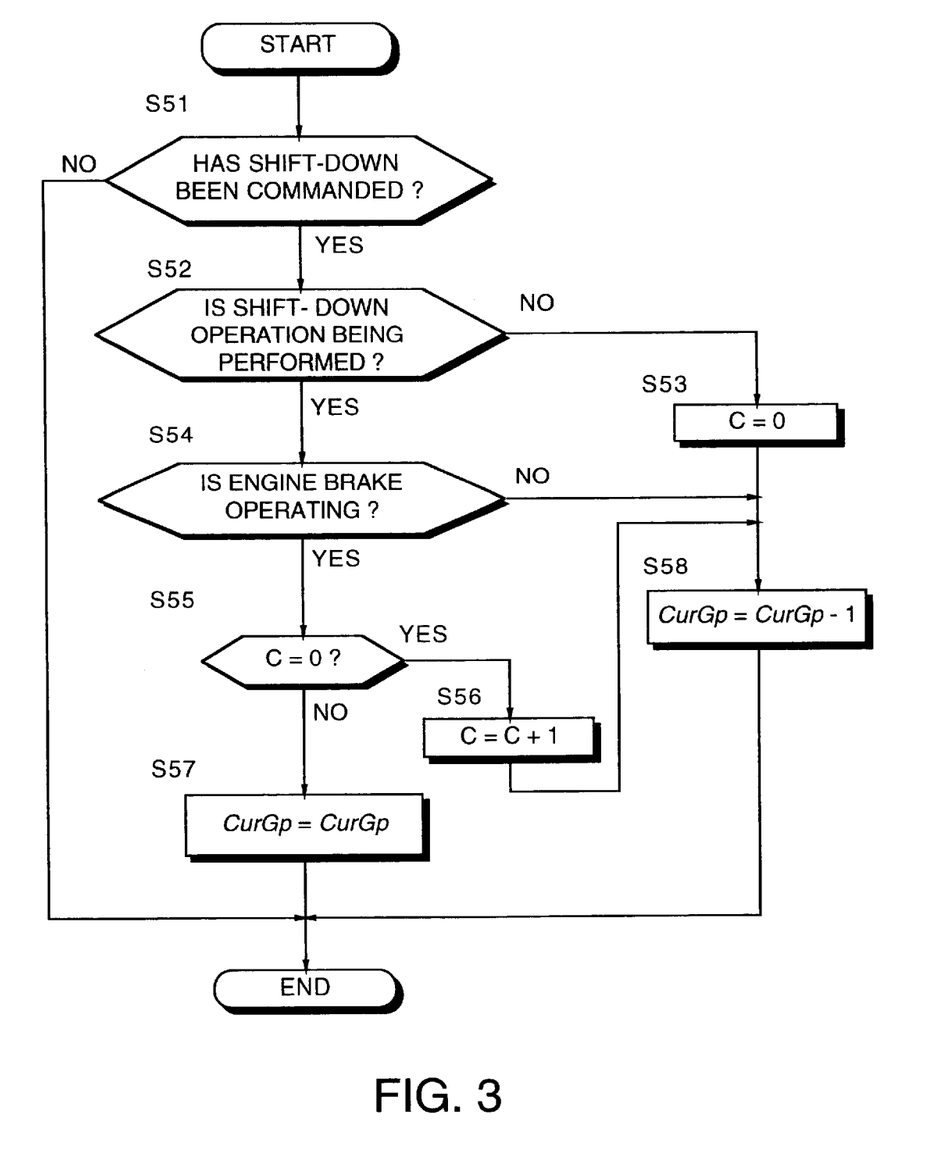
FIG. 3 is a flowchart describing a process of determining a speed range performed by the speed change control device in the manual operation mode.

Next, the process of determining a speed change ratio in the manual operation mode performed by the M range speed change ratio determining unit 20 will be described referring to the flowchart of FIG. 3. This process is invoked when the manual operation mode is selected by operating the operating lever, i.e. when a signal is inputted selecting the manual operation mode from the M range switch 16, and repeated at a fixed interval as long as the manual operation mode is selected. When in this mode, the process execution interval is set at a much shorter interval than the time required for speed change in the transmission when in the manual operation mode.

First, in a step S51, it is determined whether or not a shift-down has been commanded based on the speed change ratio command input value M1*–M6* detected by the speed change command detection switch 17 and the current real speed change ratio $i_p$.

When a shift-down has been commanded, the routine proceeds to a step S52, and when a shift-up has been commanded, the process is terminated without executing subsequent steps. Due to this, during a shift-up operation, the input value M1*–M6* detected by the speed change command detection switch 17 is input without modification to the target primary rotation speed computing unit 21 as the command value M1–M6.

In the step S52, it is determined whether or not a shift-down operation is being performed.

This determination is made by determining whether or not a difference between or ratio of the final target speed change ratio $i_{po}$ and real speed change ratio $i_p$ is larger than a predetermined reference value. Immediately after the manual speed change mode is selected, the speed change ratio command value M1–M6 has not yet been entered in the time constant computing unit 27 and the shift-down operation has not yet started.

As a result, the determination result of the step S52 is negative in this case. This result may also be negative when a shift-down operation has been completed.

In either of the above cases, after having reset the initial flag C to 0 in the step S53, the current gear CurGp is set one step lower in a step S58, and the process is terminated. It should be noted that a lower gear means a larger speed change ratio.

On the other hand once it is determined in the step S52 that a shift-down operation is being performed, it is then determined whether or not the engine brake is operating in a step S54. This determination is made by determining whether or not the throttle opening TVO is equal to or less than a preset value $TVO_0$. In other words, when the throttle opening TVO is equal to or less than the set value $TVO_0$, it is determined that the engine brake is operating.

When it is determined that the engine brake is not operating, the current gear CurGp is set one step lower in the step S58, and the process is terminated.

When it is determined that the engine brake is operating, it is determined whether or not the initial flag C is 0 in a step S55. The initial flag C is initialized to 0 when the manual operation mode starts. Therefore, the initial flag C takes the value 0 the first time the process is performed after the input of a shift-down command or shift-up command.

If the initial flag is 0 in the step S55, it is set to 1 in a step S56. Also, the current gear CurGp is set one step lower in the step S58, and the process is terminated.

When the initial flag is not 0 in the step S55, the routine proceeds to a step S57, and the process is terminated maintaining the current gear CurGp.

The speed change ratio command value M1–M6 determined in this way is input to the target primary rotation speed computing unit 21 and the time constant computing unit 27. The target primary rotation speed computing unit 21 calculates the target primary rotation speed Npri* based on the speed change ratio command value M1–M6 and vehicle speed VSP as described hereabove. The time constant computing unit 27 determines the time constant T when the speed change ratio corresponding to the command value M1–M6 is realized.

Subsequent speed change control by the controller 10 is the same as control in the automatic operation mode.

As a result of determining the speed change ratio command value by such a process, when, for example, the driver operates the operating lever three times in succession in the shift-down direction in the manual operation mode while the vehicle is traveling at the fourth speed M4, the speed change ratio command value is determined as follows.

Specifically, a shift-down command is detected in the step S51, and the routine proceeds to the step S52. When the shift-down command is first input, a shift-down operation has not yet been performed so the routine proceeds to the step S53, and after resetting the initial flag C to 0, the speed change ratio command value is set from the current fourth speed M4 to the third speed M3, and the process is terminated. As a result, the controller 10 performs a shift-down to the speed M3.

On the next occasion the process is executed, as a shift-down is being performed from the fourth speed to the third speed, the process proceeds from the step S52 to the step S54. When the engine brake is not operating in the step S54, the speed change ratio command value is changed to the second speed M2 which is the adjacent larger speed change ratio in the step S58. On the other hand, when the engine brake is operating, the initial flag C is determined in the step S55. As the initial flag C was reset to 0 on the immediately preceding occasion the process was performed, the process proceeds to the step S56.

In the step S56, the initial flag C is set to 1, and the speed change command value is changed to the second speed M2 in the step S58 and the process is terminated.

On the subsequent occasion when the process is executed, the initial flag C is not 0, the process proceeds to the step S57 from the step S55, and the process is terminated with the speed change ratio command value being held at the second speed M2.

Therefore, only two inputs out of three shift-downs are reflected by a speed change ratio command value. A speed change is performed from the fourth speed M4 to the second speed M2, but provided that a shift-down operation and the engine brake is operating, the third shift-down input is ignored, and a speed change to the first speed M1 is not performed. A shift-down input to the first speed M1 becomes possible only after the speed change ratio corresponding to the second speed M2 is achieved, and it is determined that a shift-down is not being performed in the step S52.

In this way, by limiting shift-down inputs to a maximum of two, the driver is prevented from experiencing an excessive engine brake sensation.

Figure 4:
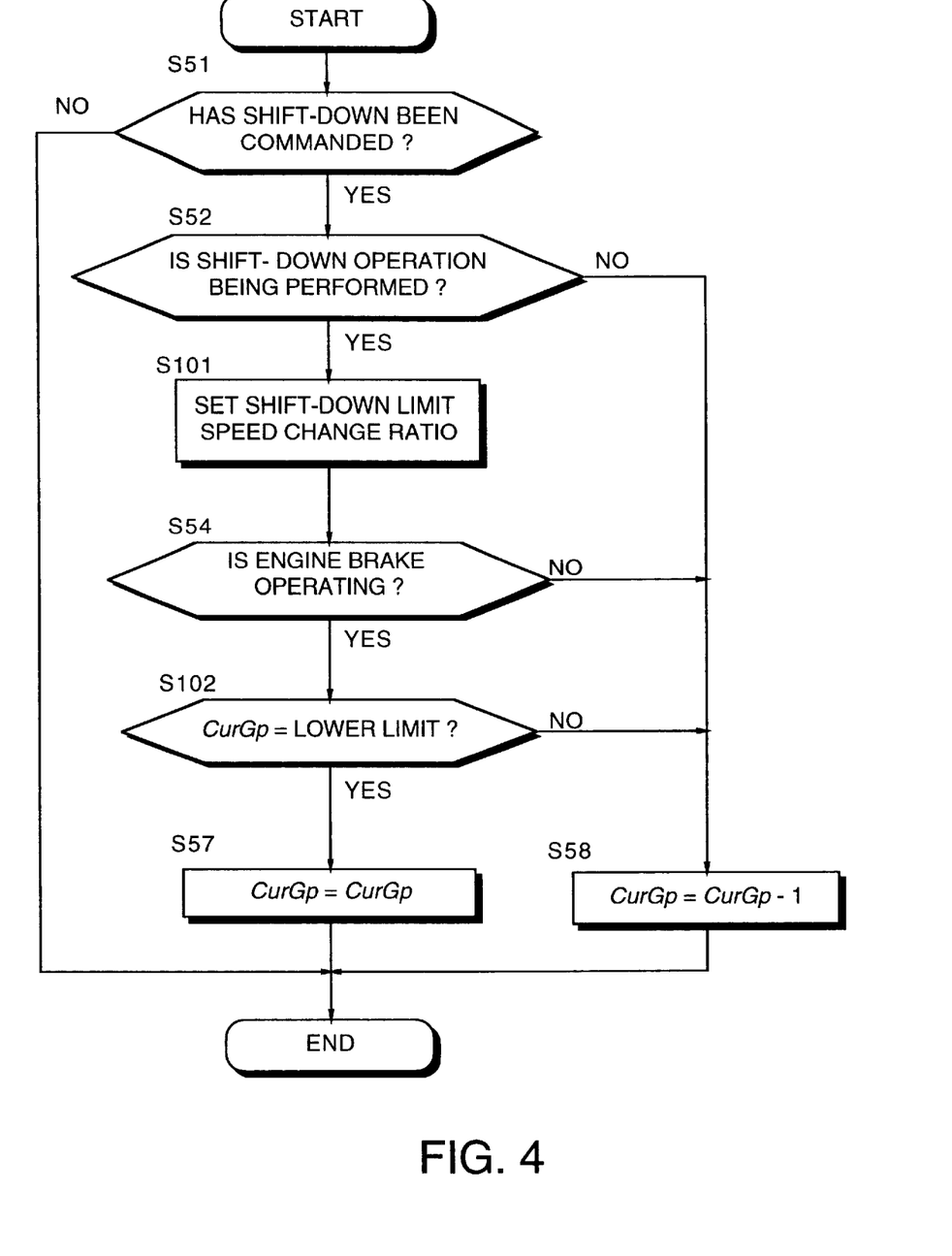
FIG. 4 is similar to FIG. 3, but showing a second embodiment of this invention.

A second embodiment of this invention relating to the limiting algorithm of shift-down operation will now be described referring to FIG. 4.

In the aforesaid first embodiment, the change of speed change ratio relative to a continuous shift-down input was limited to two times, however according to this embodiment, a shift-down limit speed change ratio is set according to the speed change ratio before the shift-down operation is started, and speed changes exceeding this shift-down limit speed change ratio are restricted even when shift-down inputs are performed in succession.

For this purpose, the steps S53, S55 and S56 of the first embodiment are discarded, a new step S101 is provided between the steps S52 and S54, and a new step S102 is provided between the steps S54 and S57. In this process, when it is determined that a shift-down operation is being performed in the step S52, the shift-down limit speed change ratio is set in the step S101 depending on the details of the shift-down input as follows.

| Shift-down input | Shift-down limit speed change ratio |
|---|---|
| M6 → M5 | M3 |
| M5 → M4 | M3 |
| M4 → M3 | M2 |
| M3 → M2 | M2 |
| M2 → M1 | M1 |

Here, the contents of shift-down input are based on a speed change ratio when it was first determined that a shift-down was commanded in the step S51. For example, when a shift-down is input at the fourth speed M4, a shift-down to the third speed M3 from the fourth speed M4 is commanded regardless of the number of times the operating lever is operated continuously, and, in this case, the shift-down limit speed change ratio is set to the ratio corresponding to the second speed M2.

To permit such a setting, the speed change ratio when the determination result of step S51 was affirmative for the first time, is stored, and determination of the shift-down limit speed change ratio in the step S101 is performed based on this stored speed change ratio. This processing is made possible by, for example, providing steps between the step S51 and step S52 firstly for determining whether or not the determination result of the step S51 is the same as on the immediately preceding occasion, and secondly for storing the current speed change ratio when the determination result is negative.

In the above table, the speed change width to the shift-down limit speed change ratio is proportional to the speed change ratio before the shift-down operation is started, i.e., the smaller the speed change ratio before the shift-down operation is started, the larger the speed change width. Herein a smaller speed change ratio denotes a higher vehicle speed. The reason for this is as follows. The engine brake power which acts during a shift-down from third speed to second speed, for example, is larger than the engine brake power which acts during a shift down from sixth speed to fifth speed. Therefore, in order not to let the driver experience an excessive engine braking sensation, shift-down through plural ratios from speed change ratios corresponding to lower speeds must be limited.

After having set the shift-down limit speed change ratio in this way, it is determined whether or not the engine brake is operating in the step S54, and if the engine brake is operating, it is determined whether or not the current speed change ratio is equal to the shift-down limit speed change ratio in the step S102.

When a shift-down operation is not being performed in the step S52, the engine brake is not being operated in the step S54 or the current speed change ratio is not equal to the shift-down limit speed change ratio in the step S102, there is no risk that the driver will experience an excessive engine braking sensation even if a shift-down is performed. In this case, the current gear CurGp is set one step lower in the step S58.

On the other hand when it is determined that the current speed change ratio is equal to the shift-down limit speed change ratio in the step S102, the current gear CurGp is maintained in the step S57 and the process is terminated.

By executing the above process repeatedly, when for example, the driver operates the operating lever three times in succession in the shift-down direction during travel at the fourth speed M4, i.e. when a speed change from the fourth speed M4 to the first speed M1 was commanded, a real speed change operation is performed only from the fourth speed M4 to the second speed M2. To perform a shift-down to the first speed M1 after shift down to the second speed M2 was completed, the operating lever must be operated again to perform another shift-down input. The same effect is therefore obtained in this embodiment as in the aforesaid first example.

Figure 5:
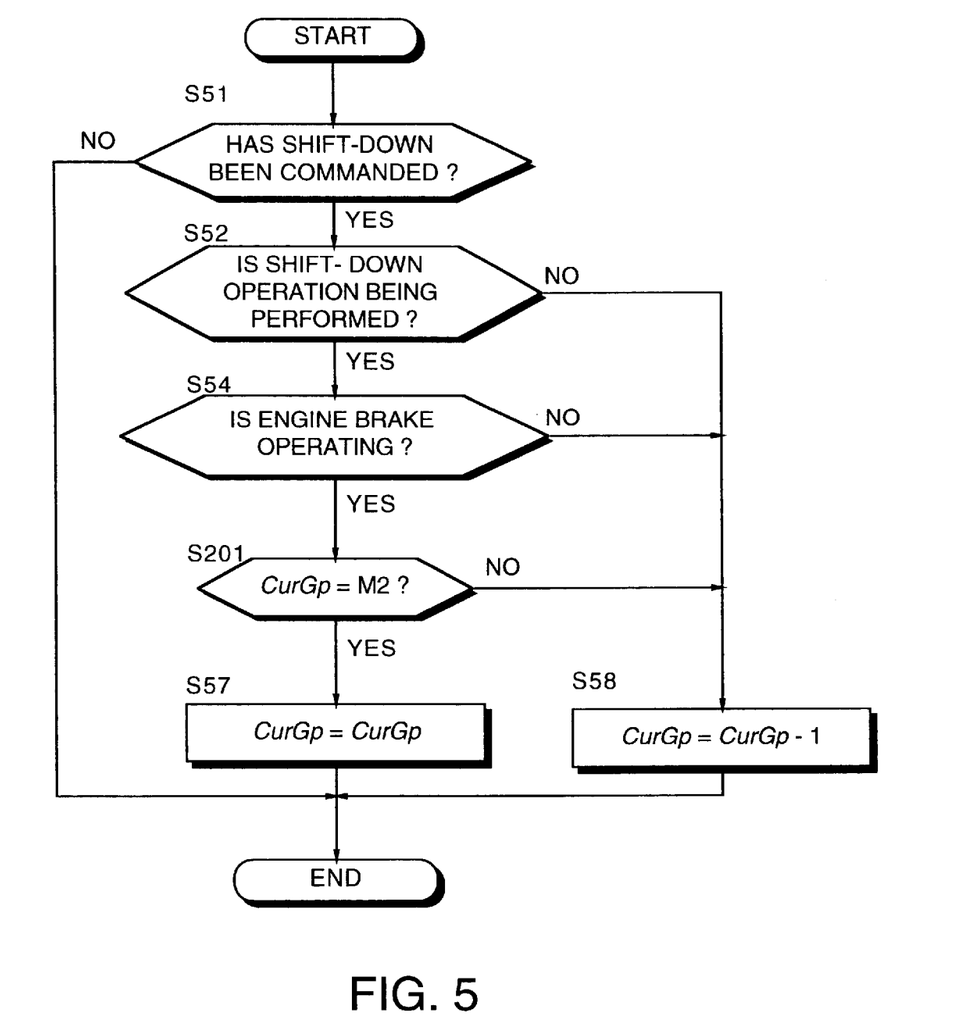
FIG. 5 is similar to FIG. 3, but showing a third example of this invention.

Next, referring to FIG. 5, a third embodiment of this invention relating to the limiting algorithm of the shift-down operation will be described.

In the aforesaid first embodiment, the change of speed change ratio relative to a continuous shift down input was limited to two, but according to this embodiment, a shift-down to the first speed M1 is prohibited when the second speed M2 is not achieved in the shift-down operation.

For this purpose, the steps S53, S55 and S56 of the first embodiment are discarded, and a new step S201 is provided between the steps S54 and S57.

In this process, when it is determined that the engine brake is operating in the step S54, it is determined in the step S201 whether or not the current gear CurGp corresponds to the speed M2. When the current gear CurGp does not correspond to the second speed M2, the current gear CurGp is set one step lower in the step S58.

On the other hand when the current gear CurGp corresponds to the second speed M2, the current gear CurGp is maintained in the step S57 and the process is terminated.

In this example, when speed change to the second speed M2 is not complete, a shift-down input to the first speed M1 is not accepted. The same effect is therefore obtained as in the aforesaid first embodiment.

In all the above examples, this invention is applied to a continuously variable transmission, but it may be applied to transmissions of all types wherein a manual shift operation is transmitted to a transmission via a controller.

Also, instead of comparing the throttle opening TVO with the set value $TVO_0$ as a method of determining whether or not the engine brake is operating in the step S54, an acceleration sensor 32 may be provided for detecting a deceleration of the vehicle in the forward/reverse direction, and the engine brake determined to be operating when the absolute value of the deceleration −G detected by the acceleration sensor 32 is equal to or larger than a set threshold value $G_0$.

Further, the determination of whether the engine brake is operating may be performed more precisely by determining that the engine brake is operating only when the throttle opening TVO is equal to or less than the set value $TVO_0$, and the absolute value of the deceleration −G is equal to or larger than the threshold value $G_0$.

It should also be noted that, in the description hereabove, the smallest speed change ratio corresponds to the highest speed and the largest speed change ratio corresponds to the lowest speed. Therefore, shift-down denotes a change-over of speed change ratio to a larger one while shift-up denotes change over of the same to a smaller one.

The corresponding structures, materials, acts, and equivalents of all means plus function elements in the claims below are intended to include any structure, material, or acts for performing the functions in combination with other claimed elements as specifically claimed. The embodiments of this invention in which an exclusive property or privilege is claimed are defined as follows:

What is claimed:

1. A speed change controller for outputting a speed change ratio command signal to a transmission of a vehicle for selectively applying plural speed change ratios from a largest speed change ratio to a smallest speed change ratio according to a command input by a driver, said vehicle comprising an engine being capable of exerting an engine brake on said vehicle according to a reduction operation input by the driver, said controller comprising:

an engine brake sensor for detecting whether or not said vehicle is under the action of said engine brake, a real speed change ratio detection sensor for detecting a real speed change ratio of said transmission, and a microprocessor programmed to:

determine whether or not said transmission is performing a shift-down operation, determine a shift-down limit speed change ratio based on the real speed change ratio before said shift-down operation is performed, wherein the shift-down limit speed change ratio is greater than the real speed change ratio, and permit performance of a shift-down operation when said vehicle is under the action of the engine brake until the speed change ratio command signal corresponds to a speed change ratio equal to said shift-down limit speed change ratio.

2. A speed change controller as defined in claim 1, wherein said microprocessor is further programmed to determine said shift-down limit speed change ratio such that the larger the speed change ratio before said shift-down operation is performed, the smaller the difference between said shift-down limit speed change ratio and said speed change ratio before said shift-down operation is performed.

3. A speed change controller as defined in claim 1, wherein said microprocessor is further programmed to determine said shift-down limit speed change ratio such that a difference between said shift-down limit speed change ratio and said speed change ratio before said shift-down operation is performed is equivalent to a difference corresponding to two consecutive shift-down operations.

4. A speed change controller as defined in claim 1, wherein said engine comprises a throttle for increasing and decreasing output, and said engine brake sensor comprises a throttle opening sensor for detecting that an opening of said throttle is equal to or less than a predetermined threshold value.

5. A speed change controller as defined in claim 1, wherein said engine brake sensor comprises a deceleration sensor for detecting that a deceleration of said vehicle in the forward/reverse direction surpasses a predetermined threshold value.

6. A speed change controller as defined in claim 1, wherein said engine comprises a throttle for increasing and decreasing output, said engine brake sensor comprises a throttle opening sensor for detecting that an opening of said throttle is equal to or less than a predetermined first threshold value and a deceleration sensor for detecting that a deceleration of said vehicle in the forward/reverse direction surpasses a predetermined second threshold value, and said microprocessor is further programmed to determine that said vehicle is under the action of said engine brake when said throttle opening is equal to or less than said first threshold value, and said deceleration of said vehicle in the forward/reverse direction surpasses said second threshold value.

7. A speed change controller for outputting a speed change ratio command signal to a transmission of a vehicle for selectively applying plural speed change ratios from a largest speed change ratio to a smallest speed change ratio according to a command input by a driver, said vehicle comprising an engine being capable of exerting an engine brake on said vehicle according to a reduction operation input by the driver, said controlling comprising:

means for detecting whether or not said vehicle is under the action of said engine brake, means for detecting a real speed change ratio of said transmission, means for determining whether or not said transmission is performing a shift-down operation, means for determining a shift-down limit speed change ratio based on the real speed change ratio before said shift-down operation is performed, wherein the shift-down limit speed change ratio is greater than the real speed change ratio, and means for permitting performance of a shift-down operation when said vehicle is under the action of the engine brake until the speed change ratio command signal corresponds to a speed change ratio equal to said shift-down limit speed change ratio.

8. A speed change controller for outputting a speed change ratio command signal to a transmission of a vehicle for selectively applying plural speed change ratios from a largest speed change ratio to a smallest speed change ratio according to a command input by a driver, said vehicle comprising an engine being capable of exerting an engine brake on said vehicle according to a reduction operation input by the driver, said controller comprising:

an engine brake sensor for detecting whether or not said vehicle is under the action of said engine brake, a real speed change ratio detection sensor for detecting a real speed change ratio of said transmission, and a microprocessor programmed to:

determine whether or not said transmission is performing a shift-down operation, set a shift-down limit speed change ratio to a second largest speed change ratio of said plural speed change ratios, wherein the shift-down limit speed change ratio is greater than the real speed change ratio, and permit performance of a shift-down operation when said vehicle is under the action of the engine brake until the speed change ratio command signal corresponds to a speed change ratio equal to said shift-down limit speed change ratio.

* * * * *